United States Patent [19]

Hetman, Jr.

[11] 4,006,002
[45] Feb. 1, 1977

[54] GLASS SHEET TRANSFER APPARATUS

[75] Inventor: Thomas Hetman, Jr., Perrysburg, Ohio

[73] Assignee: Libbey-Owens-Ford Company, Toledo, Ohio

[22] Filed: Oct. 15, 1975

[21] Appl. No.: 622,687

[52] U.S. Cl. .................... 65/114; 65/116; 65/349; 271/243

[51] Int. Cl.² .................................. C03B 27/00

[58] Field of Search ............ 65/114, 115, 116, 348, 65/349, 350, 351; 271/243, 244

[56] References Cited

UNITED STATES PATENTS

| | | | |
|---|---|---|---|
| 2,296,691 | 9/1942 | Sullivan et al. | 65/348 X |
| 3,174,839 | 3/1965 | Long | 65/114 |
| 3,536,464 | 10/1970 | Seymour | 65/114 X |

Primary Examiner—Arthur D. Kellogg
Attorney, Agent, or Firm—Collins, Oberlin & Darr

[57] ABSTRACT

A sheet handling apparatus including means in the form of support feet for "catching" or receiving the bottom edge of a vertically descending sheet upon the release of the upper portion of the glass from gripping tongs which initially support the sheet in a vertical plane. The bottom edge of the sheet engages the support feet substantially simultaneously with the release of the tongs to effect a smooth transition without interruption during continuous downward movement of the sheet.

18 Claims, 9 Drawing Figures

4,006,002

GLASS SHEET TRANSFER APPARATUS

BACKGROUND OF THE INVENTION

The present invention relates generally to a material handling apparatus and, more particularly, to an apparatus for handling sheet material.

It is common practice in the tempering of glass sheets to initially heat the sheets in a furnace to substantially the softening point of the glass and then to suddenly chill the heated sheets below the annealing range of glass to place the outer surfaces thereof under compression and the interior under tension. This process improves the mechanical properties of the glass by increasing the physical strength thereof and modifying its breaking characteristics so that when a tempered glass sheet is broken it will shatter or disintegrate into relatively small, harmless particles rather than dangerously large pieces having jagged edges. When forming bent tempered glass, a shaping operation is interposed between the heating and chilling steps to impart the desired curvature to the sheet.

One well-known expedient for handling glass sheets in a mass production operation is to support the sheet in a vertical plane when processing the same through the various stages of heating, bending and/or tempering. The glass sheets are supported vertically by means of tongs which grip the opposite faces of the glass sheet adjacent the upper edge thereof. These tongs may be suspended from overhead conveyors or elevators which advance the glass sheet through various stations in either a horizontal or vertical path to form the bent and/or tempered glass sheets. In processes wherein the suspended sheet is advanced vertically through the various stations, very often the chilling medium is a liquid bath into which the heat-softened sheet is ultimately lowered. Sometimes, however, the chilling medium may be cooling gases in the form of streams directed through a plurality of nozzles or tubes mounted in opposed blastheads against the opposite surfaces of the glass. In the latter procedure, it is important that provision be made for relative movement between the heat-softened glass and the blastheads to assure uniform tempering throughout and avoid an undesirable pattern of iridescent spots otherwise formed by the blast of the streams impinging against localized or concentrated areas of the glass sheet. The most expedient technique in providing this relative movement in a vertical line is to continuously advance the sheet between stationary blastheads. However, this poses a problem when glass supporting tongs are employed because the spacing of the blasthead tubes from the opposite surfaces of the glass sheet, which should be at a predetermined optimum distance in order to achieve a uniform and quality temper, must be compromised to provide sufficient clearance for the passage of such tongs between the blasthead tubes.

SUMMARY OF THE INVENTION

Accordingly, a primary object of the present invention is to provide a solution to the above problem by providing an apparatus for transferring the glass sheet from a tong support to another support arrangement without interruption during continuous descending movement of the sheet through a tempering station.

Another object of this invention is to provide in the foregoing apparatus a reciprocal sheet catching or receiving arrangement for receiving the bottom edge of a glass sheet substantially simultaneously with the release of the glass from the overhead supporting tongs without interrupting the continuous movement of the sheet in its vertical path.

The foregoing and other objects, advantages, and characterizing features of the present invention will become clearly apparent from the ensuing detailed description thereof considered in conjunction with the accompanying drawings wherein like reference characters denote like parts throughout the various views.

DESCRIPTION OF THE PREFERRED EMBODIMENT

Figure 1:
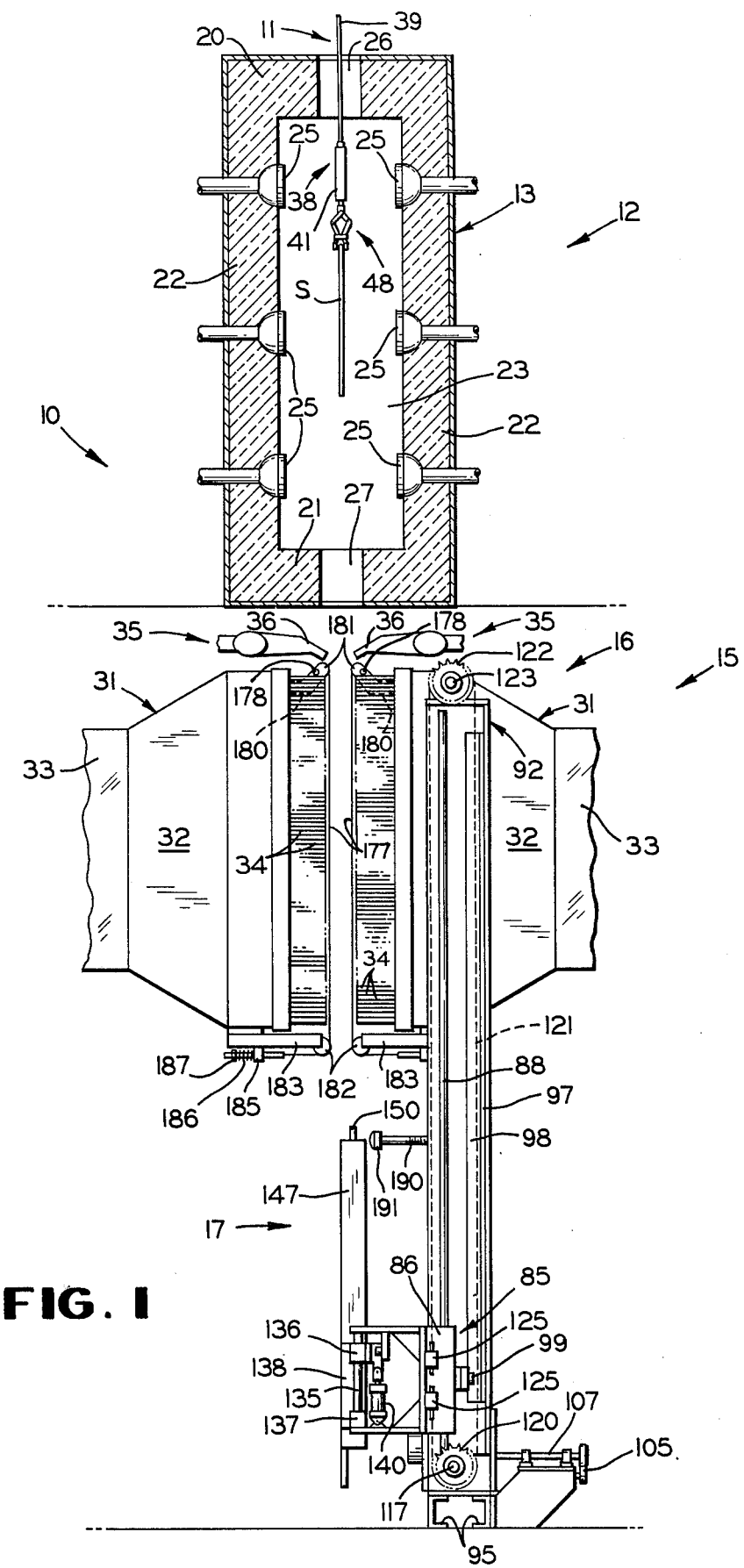
FIG. 1 is a side elevational view, partially in section, of a heating and tempering apparatus embodying the novel sheet handling apparatus of the present invention.

Referring now in detail to the illustrative embodiment depicted in the accompanying drawings, there is shown in FIG. 1 a glass sheet heat treating apparatus, comprehensively designated 10, which includes a conveyor system 11 adapted to support a glass sheet S in a vertical plane for movement along a substantially vertical path through a heating station 12 having a furnace 13 for heating the glass to its softening point and a tempering station 15 having chilling means 16 for rapidly reducing the temperature of the heat-softened glass sheet to impart the desired temper therein. As the sheet S is lowered into and through the tempering station 15, it is released and transferred while continuing to descend onto a vertically reciprocal glass receiving apparatus, generally designated 17, constructed in accordance with the principles of this invention and which will hereinafter be described in detail.

While it will be convenient to describe the apparatus of this invention in connection with the tempering of flat sheets of glass, it should be understood that the subject apparatus is equally suited for tempering curved or bent glass sheets. In such procedures, the bending station would either be interposed between the heating and chilling stations or be located upstream of heating station 12, in which case the latter could be employed as a boost heater to make up heat losses occurring during bending and thereby assure that the glass sheet is preserved in a heat-softened or viscous condition necessary for proper tempering.

In the illustrated embodiment, the glass sheets are heated in the furnace 13, which is of a generally rectangular shape in cross section having a top wall 20, a bottom wall 21, and a pair of side walls 22 defining a heating chamber 23. The heating chamber 23 can be heated in any desired manner by suitable heating elements, such as gas burners 25 or electrical resistance elements (not shown) for example, located in the side walls 22 of furnace 13. Such heating means are suitably controlled by apparatus (also not shown) to obtain the desired temperature at various points in the heating chamber 23. The sheets are lowered by the conveyor system 11 into the heating chamber 23 through an inlet opening 26 formed in top wall 20 and are removed therefrom through an exit opening 27 formed in the bottom wall 21 of furnace 13. The sheet S is heated in a controlled manner to the desired temperature in heating chamber 23 during its passage therethrough and upon emerging through opening 27, continues to descend into the tempering station 15.

The chilling means 16 in tempering station 15 comprises a pair of opposed blastheads 31 disposed on opposite sides of the path of vertical movement of the sheet S and is operable to direct blasts of cooling fluid, such as air for example, toward and against the opposite surfaces of the sheet moving downwardly along such path. Each of the blastheads 31 includes a plenum chamber 32 connected, through a flexible conduit 33, to a source of pressurized gas (not shown). A plurality of tubes 34, communicating with the plenum chamber 32, project inwardly therefrom toward the path of movement of the sheet S to direct a plurality of streams of cooling gases toward the opposite surfaces of the hot glass sheet.

In order to prevent "blow back" of the cooling air from the tempering station 15 upwardly into furnace 13, a pair of opposed fins 35 are located above the blastheads 31 to direct opposed curtains of air under pressure across the upper ends of the blastheads and inwardly toward the descending sheet. Each fin 35 comprises a tubular body connected to a suitable source of air under pressure (not shown) and having a reduced outlet end portion 36 angled slightly downwardly and provided with an elongated slot 37 (FIG. 4) extending transversely across the blastheads 31.

The means for supporting and suspending the sheets S for movement in a vertical plane includes a vertically reciprocal carriage, generally designated 38, suspended from a pair of lift cables 39 for raising and lowering the carriage 38. Any conventional drive arrangement can be employed for actuating the cables 39 and, since such arrangements, per se, form no part of this invention, no further description or amplification thereof is believed necessary.

Figure 4:
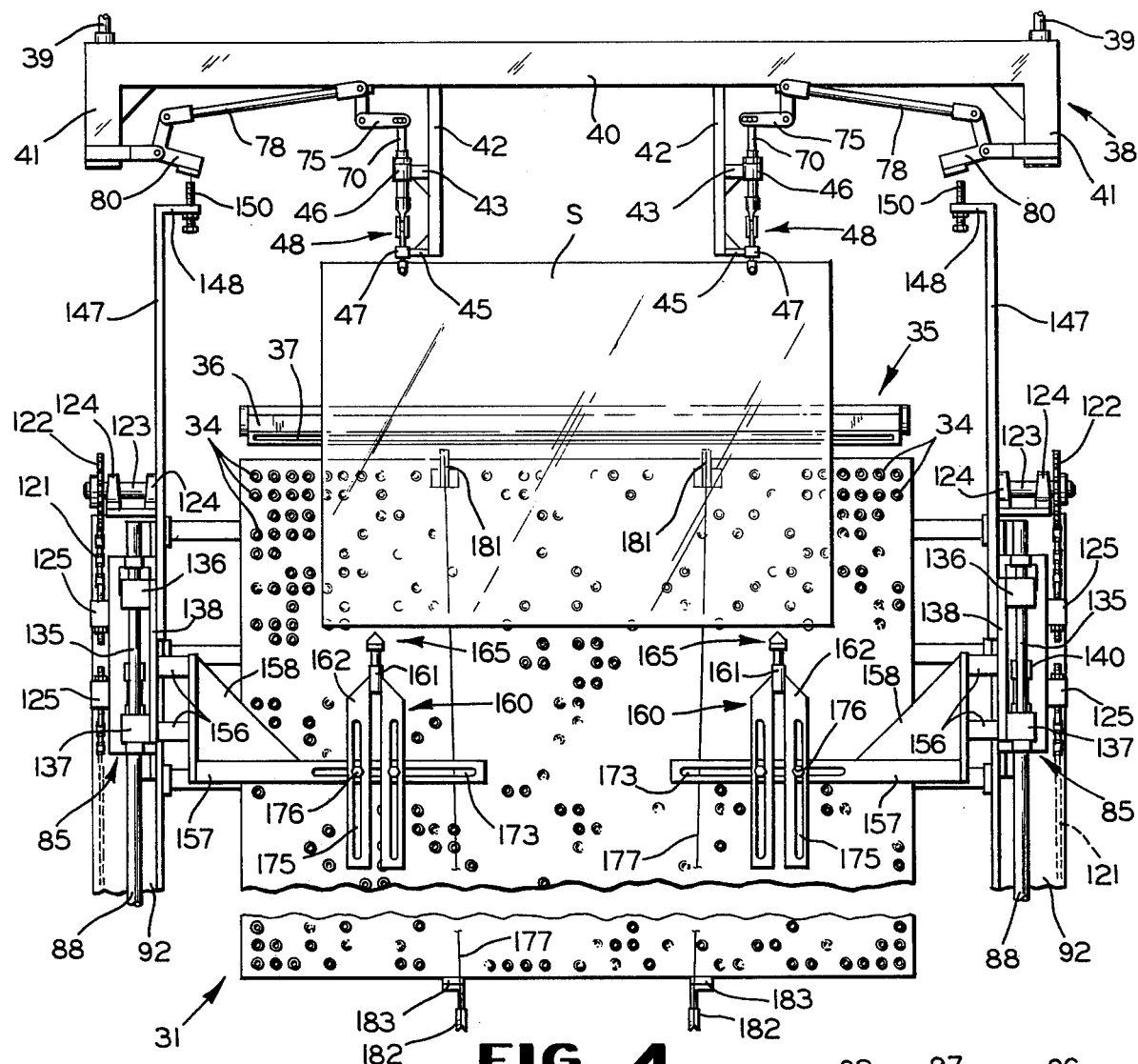
FIG. 4 is a view similar to FIG. 2, showing the glass receiving apparatus in its upper rest position.
Figure 7:
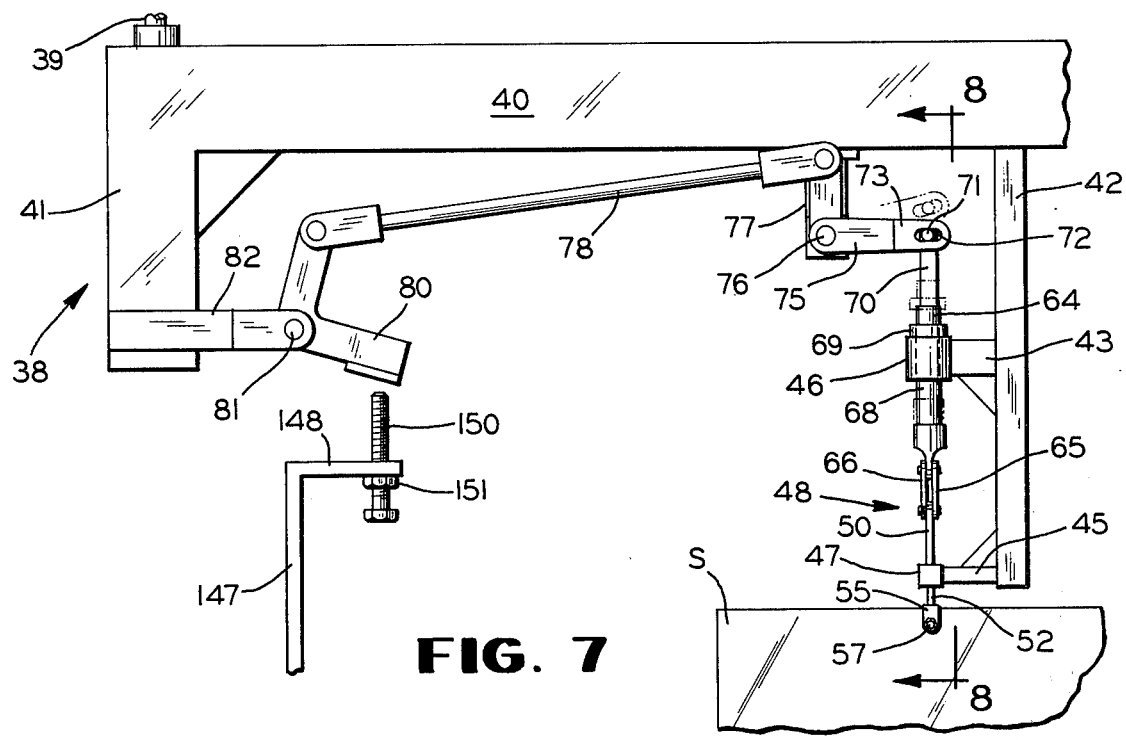
FIG. 7 is an enlarged fragmentary front elevational view of the tong releasing mechanism associated with this invention.

As best shown in FIGS. 4 and 7, the carriage 38 includes an elongated, horizontally extending tong bar 40 having downwardly extending legs 41 at the opposite ends thereof. A pair of tong support members 42, located inwardly of the legs 41, is rigidly secured to and extend downwardly from tong bar 40. Each support member 42 is provided with vertically spaced, laterally directed brackets 43 and 45 having a bushing 46 and a pivot block 47, respectively, for supporting each set of tongs 48 described below.

Each tong arrangement 48 comprises a pair of tong arms 50 and 51 (FIG. 8) provided at their lower ends with outwardly divergent portions 52 and 53 having fingers 55 and 56 welded or otherwise fixedly secured thereto. The fingers 55 and 56 are suitably tapped to receive threaded holding pins 57 for clamping the sheet therebetween. Lock nuts 58 are threaded on pins 57 to secure the latter in an adjusted glass holding position.

Tong arms 50 and 51 are pivotally mounted at the juncture of their major portions with their respective divergent portions 52 and 53 on pins 60 and 61 extending transversely across block 47. The tong arms 50 and 51 are pivotally connected at their upper ends as at 62 and 63, to links 65 and 66, in turn pivotally connected by a common hinge pin 67 to a suspended bar 68 passing upwardly through the bushing 46 for sliding movement relative thereto.

Figure 8:
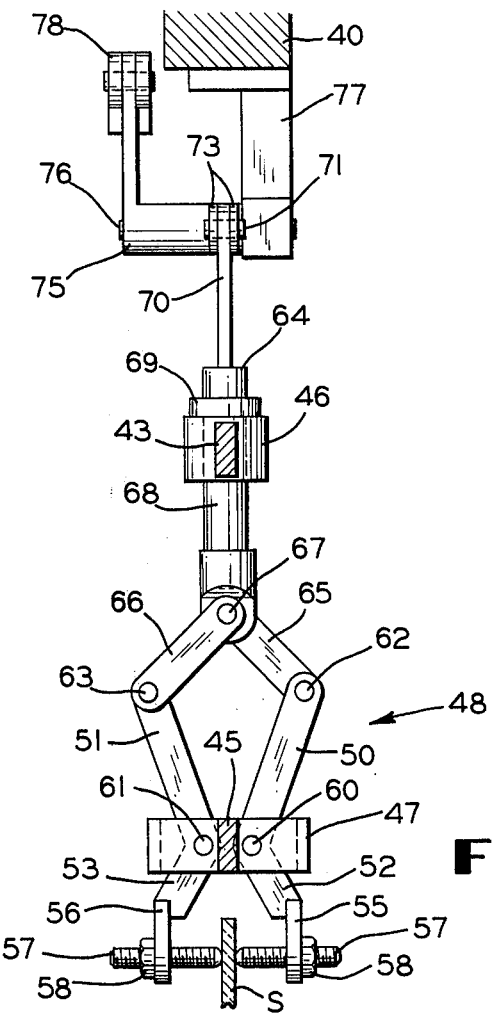
FIG. 8 is a vertical sectional view, on an enlarged scale, taken along line 8—8 of FIG. 7.

A weighted collar 64 is mounted on bar 68 and is provided with an annular flange 69 resting on bushing 46 when the sheet is grasped between holding pins 57 as shown in FIG. 8. The bushing 46 serves as a stop limiting the downward movement of bar 68 and thereby the inward force of pins 57 acting against the sheet S. The threaded pins 57 can be axially adjusted to provide a sensitive adjustment having just the right amount of holding force without unduly damaging the glass sheet. An upward axial force or pull on collar 64 and thereby bar 68 is effective to pivot links 65 and 66 inwardly toward each other to cause the major portion of tong arms 50 and 51 to pivot inwardly about pins 60 and 61 for swinging the lower portions 52 and 53 thereof, along with fingers 55 and 56, outwardly to disengage pins 57 from the sheet and release the same. When the upward force or pull is removed, the weighted collar 64, along with the weight of bar 68, causes the latter to drop by gravity until the flange 69 abuts bushing 46 to swing the tong arms 50 and 51 into their clamping positions.

The means for actuating bar 68 to release tongs 48 includes a flat rod 70 secured to and extending upwardly from collar 64. Rod 70 is provided at its upper end with a transversely extending pin 71 projecting laterally outwardly therefrom and which is received in the opposed elongated slots 72 formed in the end bifurcations 73 of a bell crank 75. The bell crank 75 is pivotally mounted on a hinge pin 76 secured to a block 77 extending downwardly from tong bar 40. The other end of bell crank 75 is pivotally connected to one bifurcated end of a connecting rod 78, which is pivotally connected at its other bifurcated end to a bell crank 80, pivotally mounted as shown at 81 in FIG. 7, on a bracket 82 projecting inwardly from the tong bar leg 41. Pivotal movement of the bell crank 80 in a counter-clockwise direction, as viewed in FIG. 7, effects, via the linkage described above, lifting of the bar 68 and opening of the tong arms 50 and 51 to release the sheet S. Means, associated with the glass receiving apparatus 17, is provided for actuating bell crank 80 at the appropriate time, as will hereinafter be explained.

It should be appreciated that the spacing of the blasthead tube outlets from the opposite surfaces of a hot glass sheet is an important consideration in air quenching in order to produce sufficient quantities of cooling gases at the opposite surfaces of the sheet at pressures which will not adversely affect the finished product. This is especially true in processing thin glass sheets, ranging in thicknesses from about 0.090 to 0.156 inch for example. While the apparatus of this invention is not restricted to the treating of thin glass sheets, but has utility in handling a wide variety of glass sheet thicknesses and sizes, it should be recognized that the present invention contemplates the processing of such thin sheets, whether flat or bent, if desired.

By suitable calculations, the optimum spacing between the blasthead tubes and the opposite surfaces of the glass sheet to be tempered can be readily determined. This optimum spacing should extend throughout the entire surface area of the sheet and, of course, when curved sheets are being tempered, the length of the tubes can vary transversely of the path of movement of the sheet to correspond to the curvature thereof. In either event, it is apparent that if the sheet is to be supported solely by the tongs 48 as it descends through the blastheads, the spacing between the blasthead tubes and the opposite surfaces of the sheet must be compromised and generally will not be at the desired optimum distance in order to provide the necessary clearance for the passage of the tongs between the blastheads. The quality of the resultant temper will be sacrificed accordingly.

The glass receiving apparatus 17 of the present invention provides a solution to the above problem by catching or receiving the bottom edge of the glass sheet while substantially simultaneously releasing the tongs before the latter descend into the space between the blastheads during the continuous downward movement of the sheet between the blastheads. Thus, the support of the sheet is transferred from the tongs to apparatus 17 during continuous downward movement of the sheet, without interruption, during the tempering operation to achieve a uniform temper and minimize, if not entirely eliminate, iridescence otherwise caused by the blast of streams impinging against concentrated areas of a stationary sheet.

To this end, apparatus 17 comprises a pair of laterally spaced slides, generally designated 85, adapted to be vertically reciprocated in unison from a lower position of rest shown in FIG. 1 to an elevated or upper position of rest shown in FIG. 4. Since the slides 85 are identical in construction and mirror images of each other, the description generally will be restricted to only one, it being understood that the same reference characters will be applied to similar parts.

Figure 3:
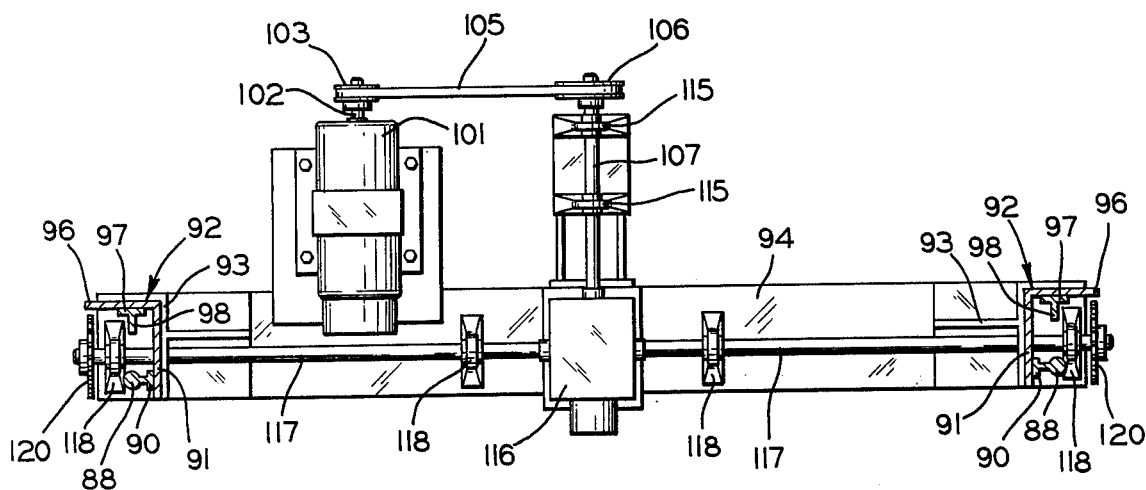
FIG. 3 is a horizontal sectional view taken along line 3—3 of FIG. 2.
Figure 5:
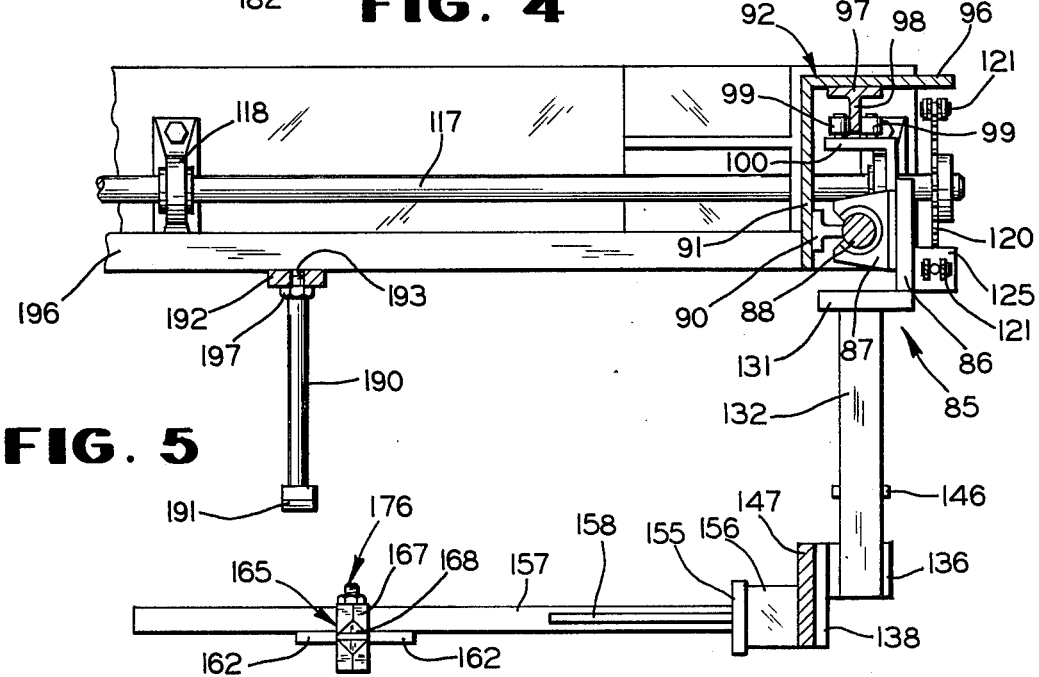
FIG. 5 is a horizontal sectional view, on an enlarged scale, taken along line 5—5 of FIG. 2.
Figure 6:
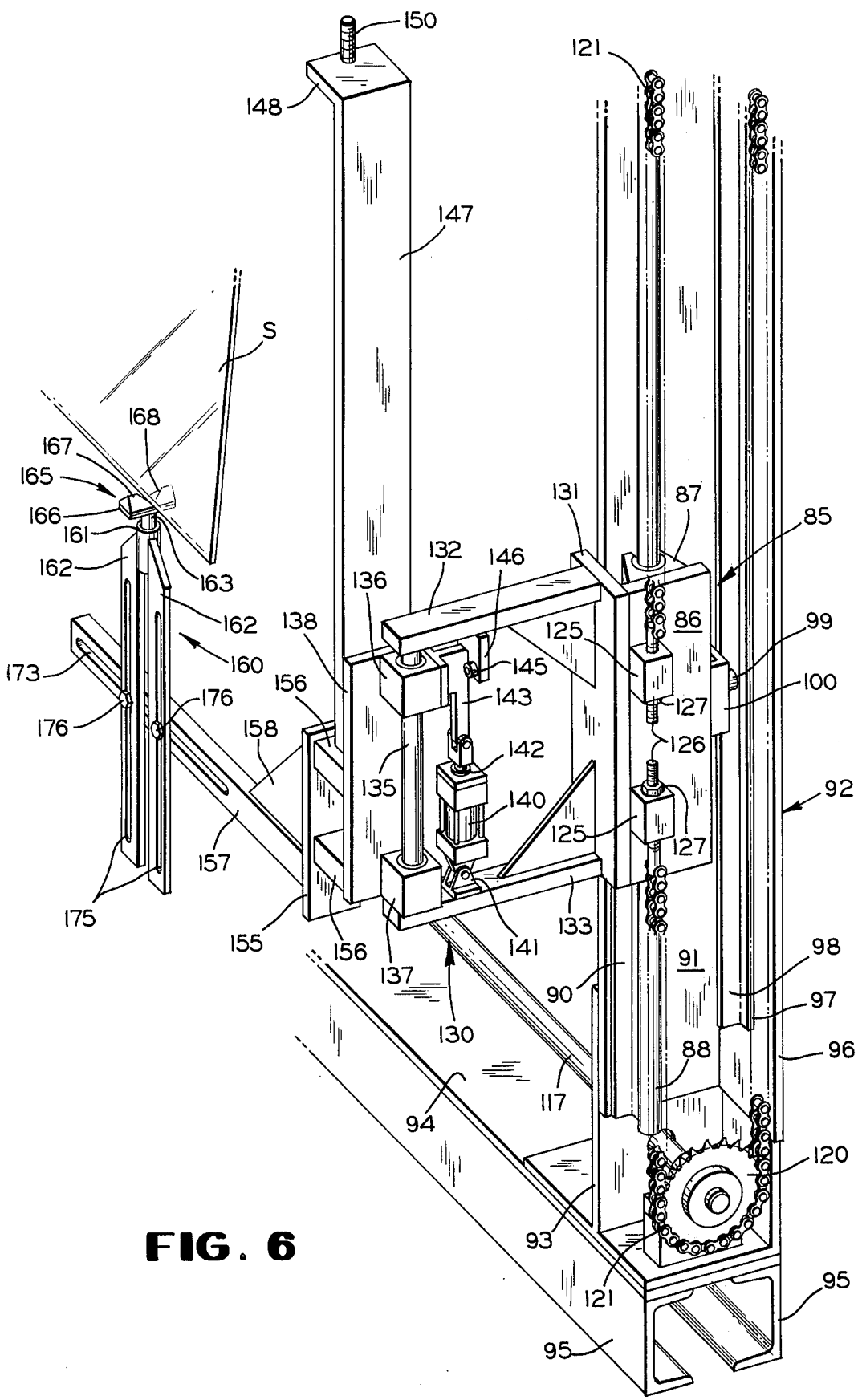
FIG. 6 is an enlarged perspective view, showing the elevating means for the glass receiving apparatus and a tong release actuating mechanism.

As best shown in FIG. 6, each slide 85 comprises a frame 86 having a pair of vertically spaced bushings 87 adapted to slide on a vertically extending main slide rail or shaft 88 connected along its base 90 (FIGS. 3 and 6) to one leg 91 of a vertically extending structural angle 92. The angle 92 is rigidly secured at its lower end to a base member 93, in turn connected to a horizontally extending base plate 94 supported on a pair of horizontally extending structural members 95. Rigidly secured to the other leg 96 of angle 92 is a guide rail 97 of generally T-shaped configuration in cross section with the web 98 thereof adapted to guide a pair of rollers 99 (FIG. 5) journalled for rotation on an angle member 100 forming a part of the slide frame 86. Slide 85 is thus guided for vertical reciprocatory movement by means of spaced bushings 87 and rollers 99 riding along shaft 88 and guide rail 97, respectively.

The means for raising and lowering slides 85 in unison includes an electric motor 101 (FIGS. 2 and 3) connected to a suitable source of electrical power (not shown) and having an output shaft 102 provided with a pulley 103 having a drive belt 105 entrained thereabout and about a pulley 106 secured to a drive shaft 107 for rotating the same. The drive shaft 107 is journalled in spaced bearings 115 and is operatively connected, via gear reduction box 116, to axially aligned shafts 117 journalled for rotation at the same rate of speed in spaced bearings 118 mounted on the base plate 94. As best shown in FIG. 6, each shaft 117 is provided with a drive sprocket 120 about which a drive chain 121 is entrained. Chain 121 also is trained about an idler sprocket 122 (FIGS. 1 and 4) mounted on a shaft 123 located adjacent the upper end of angle member 92 and journalled for rotation in spaced bearing blocks 124. The drive chain 121 is anchored at its ends to the slide frame 86 by means of vertically spaced adjusting blocks 125. Each end of chain 121 is suitably secured to a stud 126 threaded into a tapped bore formed in the block 125, which is welded or otherwise fixedly secured to slide frame 86. The studs 126 can be threaded into and out of the blocks 125 for adjusting the tension of drive chain 121 and are secured in their selective adjusted positions by lock nuts 127.

Projecting laterally outwardly from slide frame 86 is a supporting framework 130 comprising a vertical plate 131 rigidly secured to slide frame 86, spaced upper and lower bars 132 and 133 and a vertically extending guide rod 135 all connected together to form a rigid, box-like structure. A pair of vertically spaced slide blocks 136 and 137 is mounted on guide rod 135 for vertical sliding movement relative thereto and is welded or otherwise fixedly secured to a flat mounting plate 138 for vertical movement therewith.

The means for raising and lowering slide blocks 136 and 137 and thereby mounting plate 138 includes a fluid cylinder 140 pivotally mounted at its head end to a lug 141 affixed to bar 133 and having the usual piston connected to a piston rod 142. An inverted L-shaped mounting bracket 143 is suitably connected at one end thereof to the piston rod and at its other end to the upper slide block 136. Thus, extension and retraction of piston rod 142 effects raising and lowering of the mounting plate 138 relative to its associated slide 85 for reasons which will presently become apparent. A roll bearing 145, mounted on a bracket 146 affixed to the underside of bar 132, engages the mounting bracket 143 to guide the plate 138 during its reciprocal movement.

An upright post member 147 is rigidly secured adjacent its lower end to mounting plate 138 for vertical movement therewith and is provided at its upper end (FIG. 7) with an inturned flange 148 having a tapped opening therethrough for receiving a tong release or tripper pin 150 engageable with bell crank 80 for actuating the tong release mechanism. The pin 150 is threaded for axial adjustment relative to bell crank 80 and is provided with a lock nut 151 to secure pin 150 in the selective adjusted position. Thus, lifting of the post member 147 raises pin 150 into engagement with bell crank 80 to actuate the latter and, via linkage 70–78, disengage tongs 48 from the glass sheet S for releasing the same.

Also secured to mounting plate 138 is the glass supporting means adapted to catch or recieve the glass sheet S when released from tongs 48. Such means include a vertically extending mounting plate 155 secured to plate 138 in spaced relation thereto by means of spacer blocks 156. An arm 157 is secured at one end thereof to the lower end of plate 155 and extends horizontally outwardly therefrom in a cantilevered fashion. A gusset plate 158, rigidly secured to plate 155 and arm 157, offers support for the arm 157. Adjustably mounted on the arm 157 is a foot holder 160 comprised of a cylindrical sleeve 161 affixed to and between the upper ends of a pair of laterally spaced plates 162.

Figure 9:
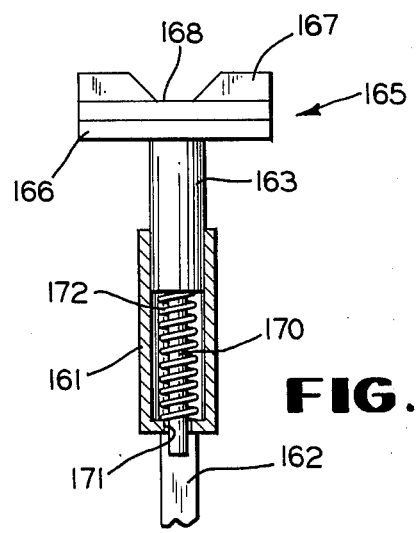
FIG. 9 is a vertical sectional view, on an enlarged scale, taken along line 9—9 of FIG. 2.

The sleeve 161 telescopically receives the shank 163 of a "catcher" foot member 165 comprising a base 166 (FIG. 9) affixed to shank 163 and a pad 167 of generally triangular configuration in cross section overlying the base 166. The pad 167 preferably is formed of any suitable insulating material having reasonable structural strength and somewhat yieldable so as to prevent damage to the glass sheet upon impact, and is provided with a generally V-shaped depression 168 centrally thereof for receiving the bottom edge of the glass sheet S. The shank 163 is provided with an extension rod 170 of reduced cross section extending downwardly through an opening 171 formed in the bottom of sleeve 161 and is encircled by a coil spring 172 abutting at its opposite ends against the base of shank 163 and the bottom wall of sleeve 161. Thus, catcher foot member 165 is resiliently mounted on holder 160 to absorb the impact of any loading applied thereto.

Elongated slots 173 and 175 are formed in arm 157 and plates 162, respectively, to adjust the holders 160 laterally and vertically as dictated by the size of the sheet being processed. Suitable fasteners 176 projecting through the intersections of the slots lock the holders 160 in their selective adjusted positions.

In the event the gaseous streams impinging against the opposite surfaces of the glass sheet S are not uniform as the sheet descends between the blastheads 31, there will be a tendency for the sheet to sway laterally toward one or the other of the blastheads 31. To prevent damage to the sheet when such a contingency arises and to direct the sheet downwardly in a substantially true vertical attitude, a pair of guide wires 177 is mounted on the forward end of each blasthead 31 to extend downwardly thereof in spaced relation to the blasthead tubes 34. The guide wires 177 extend downwardly at sight angles relative to a true vertical in a converging relation to preclude continued contact with any one point on the glass sheet as the latter descends relative to the wires 177 and thereby avoid grooving the sheet. Each of the guide wires 177 is anchored at its upper end, as by means of a fastener 178, to a wire mount 180 secured to the forward end of its associated blasthead 31 and is provided with an extension 181 projecting upwardly and forwardly of the blasthead tubes 34 for training the wire 177 thereabout. The lower end of the wire 177 is trained about a guide element 182 mounted on a bracket 183 beneath the blasthead 31 and is connected to an anchoring device 185 provided with a spring 186 and nut 187 arrangement (only one shown in FIG. 1) to adjust the tension of such wire 177. The opposed wires 177 are disposed in close proximity to each other for providing only a minimum of clearance between the wires and the sheet while the latter is being lowered therebetween to guide the sheet in its descent and to assist in maintaining the sheet in a substantially true vertical attitude so as not to disturb the aforementioned optimum spacing between the opposite surfaces of the sheet and the blasthead tube outlets.

Figure 2:
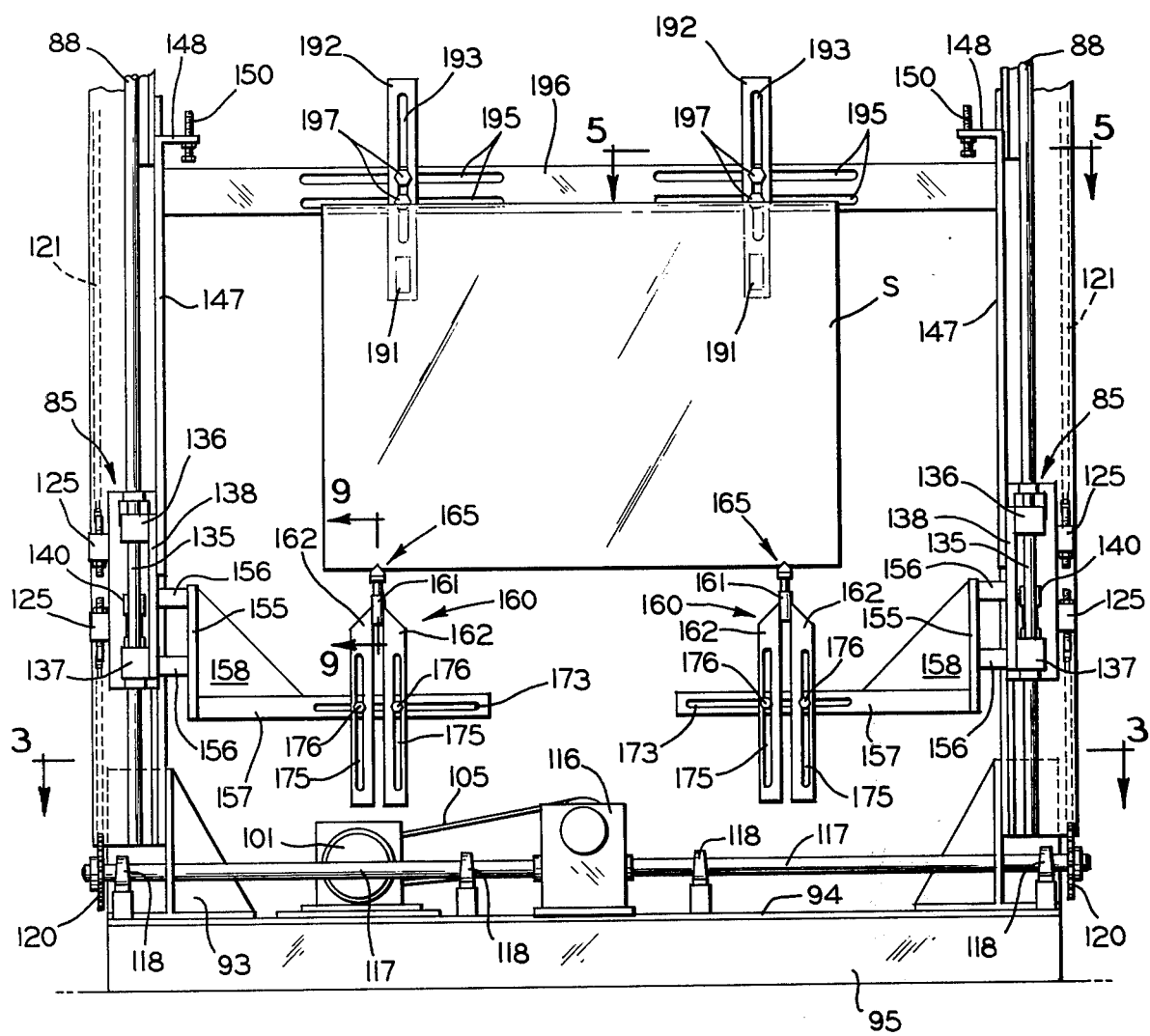
FIG. 2 is an enlarged, fragmentary front elevational view of the sheet handling apparatus of FIG. 1, showing the glass receiving apparatus in its lower rest position.

A pair of laterally spaced support members 190 having resiliently yieldable bumper pads 191 is provided beneath the blastheads 31 to support the upper portions of the sheet when lowered below blastheads 31. Referring to FIGS. 1, 2 and 5, the inner end of each support member 190 is mounted on a vertically extending bracket 192 provided with an elongated slot 193 adapted to intersect a pair of elongated slots 195 formed in a structural cross member 196. The slots 193 and 195 render the support members 190 adjustable in both a vertical and horizontal direction as dictated by the size of the sheet being processed. Suitable fasteners 197 secure the brackets 192 in their selective adjusted positions.

The mode of operation of the apparatus of this invention for handling a sheet of glass during the heating and tempering thereof is as follows:

A glass sheet S is loaded into and suspended by the spaced tongs 48 and carried in a vertical path by means of the conveyor system 11 through the heating chamber 23 wherein the sheet is heated to the viscous state necessary for proper tempering. As hereinbefore mentioned, the heating chamber 23 can be employed as a boost heater, if necessary, in the event the sheet is bent at a station upstream of heating chamber 23. The heated sheet passes downwardly through opening 27 and between the blastheads 31 for subsequent chilling through the tempering station 15.

As the bottom edge of the sheet enters the tempering station 15 and moves downwardly between the blastheads 31, a photoelectric cell or other suitable detection device (not shown) becomes operative to energize motor 101 or otherwise connect the drive train to shafts 117 for rotating the same and raise slides 85 in unison until they reach their upper positions of rest as shown in FIG. 4. The holders 160 and associated catcher feet 165 carried by the slides are lifted in unison between the blastheads 31 until they reach their upper limits in vertically spaced relation to the bottom edge of the descending sheet.

After a predetermined time, dictated by the speed and position of the descending sheet S, a second detection device (not shown) becomes operative to engage the drive train for lowering slides 85 in unison. The cylinders 140 are then actuated to extend their associated piston rods 142, approximately one inch for example, and raise mounting plates 138 accordingly, along with post 147 and catcher feet 165, relative to their respective slides 85, which are now descending at the same rate of speed as the glass sheet S. Actuation of the cylinders 140 causes the tripper pins 150 to bear against bell cranks 80 and actuate, via their associated linkages 70–78, the tongs 48 into their open position and release the sheet therefrom while simultaneously bringing the feet 165 into near, if not actual, contact with the bottom edge of the sheet. The bottom edge of the sheet engages the resiliently yieldable catcher pads 167 substantially simultaneously with the release of the tongs and is supported by such pads during further continued descent of the sheet along with the pads. In the event the pads are slightly spaced from the bottom edge of the sheet when released by the tongs, the resultant force, due to the gravity free fall of the glass sheet, will be absorbed by the springs 172 resiliently supporting these pads. The closing motion, if any, between the glass sheet and the pads 167 upon tong release is minimal to preclude glass damage due to impact. Thus, the sheet continues to move downwardly without interruption during the transfer of the sheet from the tongs 48 to the supporting catcher feet 165.

Once the rate of speeds of the tong supported sheet S and catcher feet 165 are synchronized to move downwardly at the same rate, the cumulative effect of actuating the cylinders 140 is to cause the tripper pins 150 and catcher feet 165 to move downwardly at a slower rate of speed than the sheet S to effect (1) operation of the tong release mechanism and (2) the progressive closing of the gap between the bottom edge of the sheet S and feet 165 so that the upper end of the sheet will be released from the tongs 48 at substantially the same time the bottom edge of the sheet gingerly engages the catcher feet 165 for a smooth and easy transition. However, such cylinders 140 can be disabled and/or entirely eliminated, if desired, by affixing the mounting plate 138 directly to the slide frame and timing the downward speed of slides 85 as they leave their upper positions of rest such that the instant the catcher feet 165 have accelerated up to the speed of the tong supported sheet S, the tongs 48 will be released and the bottom edge of the sheet will be just touching or in near contact with the catcher feet 165. However, it is preferable to utilize the cylinders 140 in the manner hereinbefore described because they permit more latitude in synchronizing the rate of descent of the tong supported glass and catcher feet.

The slides 85 continue to descend with the sheet now supported on catcher feet 165 and confined between guide wires 177 until the slides 85 reach their lower positions of rest (FIGS. 1 and 2) and the sheet completely clears blastheads 31. When the upper portion of the sheet clears the tempering area, it may be supported on spaced bumper pads 191. The sheet can then be removed from the catcher feet and the piston rods 142 of cylinders 140 retracted in readiness for the next cycle.

From the foregoing, it is apparent that the objects of the present invention have been fully accomplished. A new and useful material handling apparatus is provided for transferring a sheet of glass disposed in a vertical plane from an upper tong supporting arrangement to a lower catcher or support arrangement receiving the bottom edge of the sheet during the continuous vertical movement of the sheet through a tempering station. The release of the upper edge of the sheet from the suspension tongs occurs substantially simultaneously with the engagement of the bottom edge of the sheet with the catcher to avoid any significant free fall of the sheet between the upper tong support and the bottom edge receiver.

It is to be understood that the form of the invention herewith shown and described is to be taken as an illustrative embodiment of the same, and that various changes in the shape, size and arrangement of parts, as well as various procedural changes, may be resorted to without departing from the spirit of the invention.

I claim:

1. An apparatus for handling sheet material comprising: means for gripping a sheet adjacent its upper edge to suspend the same in a substantially vertical plane, means moving said sheet bodily in a generally downwardly vertical path, a support below said sheet for receiving the bottom edge of said sheet, means for moving said support in the direction of movement of said sheet at an accelerating speed until said support reaches the same rate of speed as said sheet and is spaced in close proximity thereto, and means responsive to the close positioning of said support to the bottom edge of said sheet for releasing said sheet from said gripping means and effect a transfer of said sheet from said gripping means to said support without interruption of the downward movement of said sheet.

2. A sheet handling apparatus according to claim 1 including means resiliently mounting said support to absorb any free fall impact of said sheet on said support.

3. A sheet handling apparatus according to claim 1, including a frame, at least one slide mounted on said frame for vertical reciprocal movement relative to said frame, and means supporting said sheet releasing means and said support on said slide for vertical movement therewith.

4. A sheet handling apparatus according to claim 3, wherein said support comprises at least one foot member, a holder for resiliently supporting said foot member, and means adjustably mounting said holder on said slide.

5. A sheet handling apparatus according to claim 4, wherein said foot member comprises a pad having an indentation therein for receiving the bottom edge of said sheet.

6. A sheet handling apparatus according to claim 3, wherein said sheet releasing means comprises an upright member mounted on said slide and having an actuator engageable with said gripping means for disengaging the same to release said sheet upper edge.

7. A sheet handling apparatus according to claim 2, including means on said slide mounting said sheet releasing means and said support for vertical movement relative to said slide.

8. A sheet handling apparatus according to claim 7, wherein said mounting means for said sheet releasing means comprises a reciprocal plate and means on said slide for elevating said plate relative to said slide during downward movement thereof to cause said sheet releasing means and said support to move in the same direction as, but at a slower rate of speed, than the rate of speed of said sheet.

9. A sheet handling apparatus according to claim 1, in combination with a tempering apparatus comprising a pair of opposed blastheads mounted on opposite sides of said vertical path for directing opposed streams of cooling gases against the opposite surfaces of said sheet during continuous advancement thereof in said vertical path.

10. The combination according to claim 9, including guide means for maintaining said sheet in a substantially vertical attitude upon the release thereof from said gripping means in a substantially equally spaced relation from said opposed blastheads.

11. A sheet handling apparatus according to claim 8, in combination with a tempering apparatus comprising a pair of opposed blastheads mounted on opposite sides of said vertical path for directing opposed streams of cooling gases against the opposite surfaces of said sheet during continuous advancement thereof in said vertical path.

12. The combination according to claim 11, including guide means for maintaining said sheet in a substantially vertical attitude upon the release thereof from said gripping means in a substantially equally spaced relation from said opposed blastheads.

13. A method of handling sheet material comprising: gripping a sheet solely adjacent the upper edge thereof for suspending the same in a substantially vertical plane, moving said supported sheet bodily downwardly in a generally vertical path, moving a glass receiving support below said sheet in the direction of movement of said sheet at an accelerating speed until said support reaches the same rate of speed as the rate of speed of said sheet and is spaced in close proximity thereto, releasing the upper edge of said sheet, and receiving the bottom edge of said sheet on said support during continuous movement thereof in said vertical path.

14. A method according to claim 13, including progressively closing the space between said sheet bottom edge and said support after said sheet and said support have attained the same rate of speed while simultaneously releasing the upper edge of said sheet.

15. A method according to claim 13, including directing streams of cooling air against opposite surfaces of said sheet as said sheet moves continuously in said vertical path.

16. A method according to claim 14, including directing streams of cooling air against opposite surfaces of said sheet as said sheet moves continuously in said vertical path.

17. A sheet handling apparatus according to claim 1 wherein said sheet is formed of glass.

18. A method according to claim 13, wherein said sheet is formed of glass.

* * * * *